US008327277B2

(12) United States Patent
Thakkar et al.

(10) Patent No.: US 8,327,277 B2
(45) Date of Patent: Dec. 4, 2012

(54) TECHNIQUES TO AUTOMATICALLY MANAGE OVERLAPPING OBJECTS

(75) Inventors: Pulin Thakkar, Redmond, WA (US); Noor E-Gagan Singh, Redmond, WA (US); Stuti Jain, Redmond, WA (US); Ix, Austin, TX (US); Quinn Hawkins, Kirkland, WA (US); Kapil Sharma, Woodinville, WA (US); Avronil Bhattacharjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 715 days.

(21) Appl. No.: 12/013,471

(22) Filed: Jan. 14, 2008

(65) Prior Publication Data

US 2009/0183080 A1 Jul. 16, 2009

(51) Int. Cl.
*G06F 3/048* (2006.01)
(52) U.S. Cl. ......... 715/753; 715/751; 715/766; 715/789
(58) Field of Classification Search .................. 715/733, 715/716, 758, 751, 759, 756, 753; 707/100; 345/592, 634, 619
See application file for complete search history.

(56) References Cited

U.S. PATENT DOCUMENTS

| 6,069,669 | A | 5/2000 | Park et al. | |
|---|---|---|---|---|
| 6,229,550 | B1 | 5/2001 | Gloudemans et al. | |
| 6,353,450 | B1 | 3/2002 | DeLeeuw | |
| 6,384,840 | B1 | 5/2002 | Frank et al. | |
| 6,538,660 | B1 * | 3/2003 | Celi et al. | 345/592 |
| 6,549,218 | B1 * | 4/2003 | Gershony et al. | 715/781 |
| 6,670,970 | B1 * | 12/2003 | Bonura et al. | 715/768 |
| 6,981,227 | B1 | 12/2005 | Taylor | |
| 7,068,266 | B1 | 6/2006 | Ruelle | |
| 7,176,957 | B2 * | 2/2007 | Ivashin et al. | 348/14.09 |
| 7,178,106 | B2 * | 2/2007 | Lamkin et al. | 715/716 |
| 7,231,588 | B2 | 6/2007 | Wang | |
| 2001/0047435 | A1 * | 11/2001 | Dove | 709/310 |
| 2004/0128353 | A1 * | 7/2004 | Goodman et al. | 709/204 |
| 2004/0261127 | A1 * | 12/2004 | Freeman et al. | 725/135 |
| 2006/0059432 | A1 | 3/2006 | Bells | |
| 2006/0109284 | A1 | 5/2006 | Hsieh et al. | |
| 2006/0119572 | A1 * | 6/2006 | Lanier | 345/156 |
| 2006/0164437 | A1 | 7/2006 | Kuno | |
| 2006/0294475 | A1 * | 12/2006 | Holecek et al. | 715/781 |
| 2008/0068446 | A1 * | 3/2008 | Barkley et al. | 348/14.07 |

OTHER PUBLICATIONS

Gyllstrom, Karl et al. Facetop: Integrated semi-transparent video for enhanced natural pointing in shared screen collaboration. May 15, 2005.*
Ishak, Edward W.; Feiner, Steven K. Interacting with Hidden Content Using Content-Aware Free-Space Transparency. UIST '04. Oct. 24-27, 2004, Santa Fe, New Mexico, USA.*
Atallah, SlimBen; Layaida, Oussama; De Palma, Noel; Hagimont, Daniel. Dynamic Configuration of Multimedia Applications. MMNS 2003, LNCS 2839, pp. 46-63, 2003.*

(Continued)

*Primary Examiner* — Weilun Lo
*Assistant Examiner* — Amy M Levy

(57) ABSTRACT

Techniques to automatically manage overlapping objects are described. An apparatus may include a context module operative to receive context information for a multimedia event, and determine various context parameters and control parameters for the multimedia event. The apparatus may further comprise a blending module communicatively coupled to the context module, the blending module operative to receive multiple media content streams for multiple media content views for the multimedia event, and blend the media content streams for the multiple media content views based on one or more control parameters to form a blended media content stream. Other embodiments are described and claimed.

12 Claims, 4 Drawing Sheets

OTHER PUBLICATIONS

Packard, Keith. Translucent Windows in X. Proceedings of the Eight IEEE International Symposium on Multimedia (ISM'06) 0-7695-2746-9/06.*

Friedland, Gerald and Rojas, Raul. Human-Centered Webcasting of Interactive-Whiteboard Lectures. Proceedings of the Eight IEEE International Symposium on Multimedia (ISM'06) 0-7295-2746-9/06.*

Gyllstrom, Karl. et al. Techniques for Improving the Visibility and "Sharability" of Semi-transparent Video in Shared Workspaces. ACMSE '07 Mar. 23-24, 2007. Winston-Salem, NC. ACM 978-1-59593-629-05/07/0003 pp. 425-430.*

Stotts, et al. FaceTop: Integrated Artiface and User in Synchronous Paired Collabroations via Semi-Transparent Video. Dept of Computer Science UNC at Chapel Hill TR05-005. Mar. 3, 2005.*

Biersack et al. Synchronized delivery and playout of distributed stored multimedia streams. Multimedia Systems 7: 70-90 (1999).*

"Transparency Effect: Theory and Practice", http://www.actualtools.com/articles/detail.php?ID=1084.

Baudisch, et al., "Multiblending: Displaying Overlapping Windows Simultaneously without the Drawbacks of Alpha Blending", Date: Apr. 2004, pp. 1-8.

Perlin, et al., "Pad an Alternative Approach to the Computer Interface", pp. 1-11.

* cited by examiner

TECHNIQUES TO AUTOMATICALLY MANAGE OVERLAPPING OBJECTS

BACKGROUND

A multimedia conferencing system typically allows multiple participants to communicate and share different types of media content in a collaborative and real-time meeting over a network. The multimedia conferencing system may display different types of media content using various graphic user interface (GUI) windows or views. For example, one GUI view might include video images of participants, another GUI view might include presentation slides, yet another GUI view might include text messages between participants, and so forth.

In many cases, the GUI views may be moved around to various portions of the display area. Further, a GUI view may overlap other GUI views, effectively creating layers of GUI views. In such cases, a GUI view might partially or fully occlude the media content displayed by another GUI view. Consequently, a meeting participant may be able to view only the GUI view of the top layer of the stack, and not the media content of other GUI views beneath the top layer of the stack. Accordingly, there may be a need for improved techniques to manage media content for a web conferencing system to solve these and other problems.

SUMMARY

Various embodiments may be generally directed to multimedia conferencing systems. Some embodiments may be particularly directed to techniques for automatically managing overlapping objects for a multimedia conferencing system. This may be useful for allowing applications to use a limited display area multiple times without having to switch between multiple GUI views or viewing objects.

In one embodiment, for example, an apparatus may include a context module operative to receive context information for a multimedia event, and determine various context parameters and control parameters for the multimedia event. The apparatus may further comprise a blending module communicatively coupled to the context module, the blending module operative to receive multiple media content streams for multiple media content views for the multimedia event, and blend the media content streams for the multiple media content views based on one or more control parameters to form a blended media content stream. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
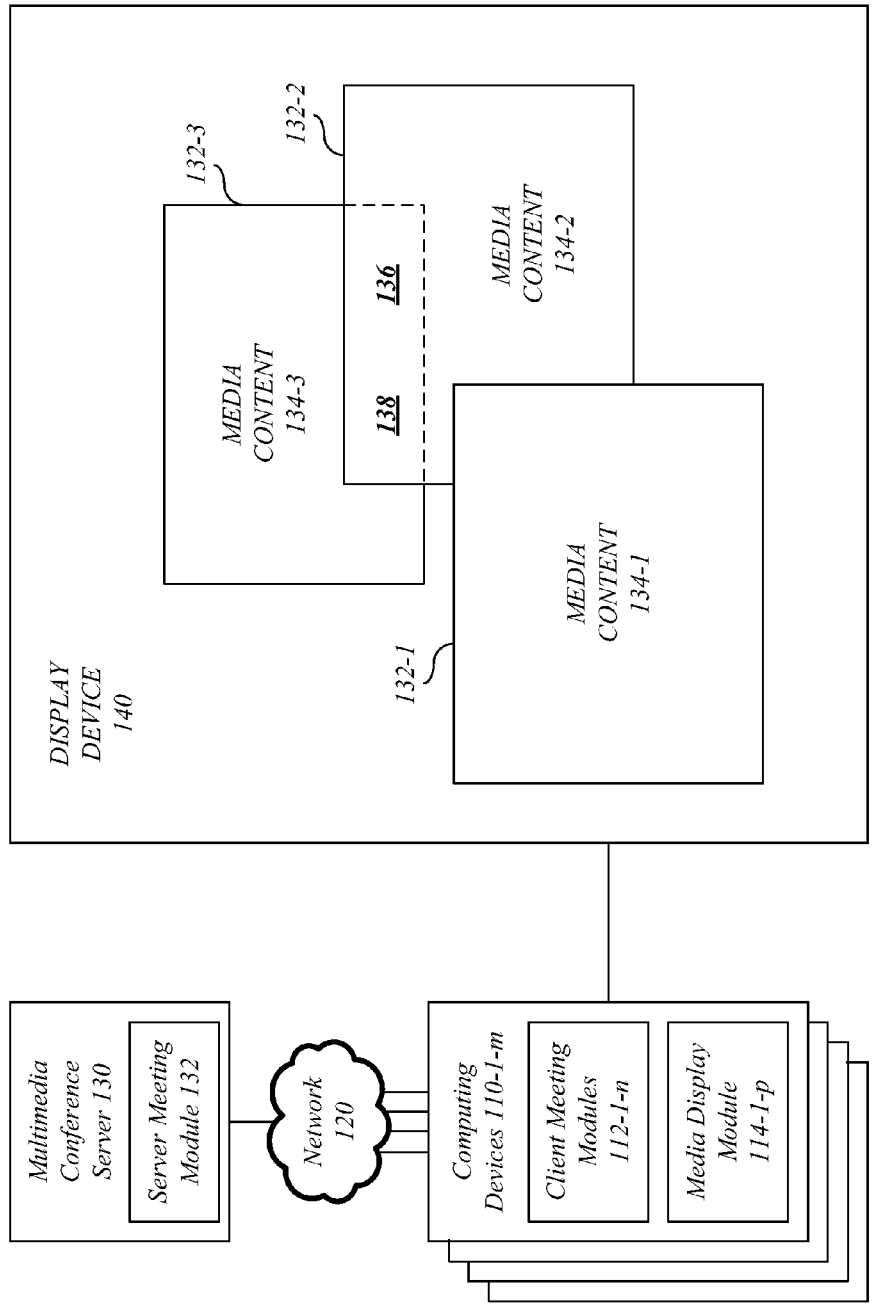
FIG. 1 illustrates an embodiment for a multimedia conference system.

Various embodiments may be generally directed to multimedia conferencing systems arranged to provide meeting and collaboration services to multiple participants over a network. Some multimedia conferencing systems may be designed to operate with various packet-based networks, such as the Internet or World Wide Web ("web"), to provide web-based conferencing services. Such implementations are sometimes referred to as web conferencing systems. An example of a web conferencing system may include MICROSOFT® OFFICE LIVE MEETING made by Microsoft Corporation, Redmond, Wash.

A multimedia conference system may include, among other network elements, a multimedia conference server or other processing device arranged to provide web conferencing services. For example, a multimedia conferencing server may include, among other server elements, a server meeting module operative to control and mix different types of media content for a meeting and collaboration event, such as a web conference. A meeting and collaboration event may refer to any multimedia conference event offering various types of multimedia information in a real-time or live online environment, and is sometimes referred to herein as simply a "meeting event" or "multimedia event."

In one embodiment, the multimedia conference system may further include one or more computing devices. Each computing device may be arranged to participate in a multimedia event by connecting to the multimedia conference server. Different types of media information from the various computing devices may be received by the multimedia conference server during the multimedia event, which in turn distributes the media information to some or all of the other computing devices participating in the multimedia event As such, any given computing device may have a display with multiple media content views, some of which may overlap, and therefore partially or fully occlude some of the media content views.

To solve the occlusion problem, some of the overlapping media content views from the top viewing layers may have varying degrees of transparency to facilitate viewing of the bottom viewing layers. The transparency of a given media content view may be achieved by utilizing a technique referred to as "alpha blending" or "alpha compositing." Alpha blending is the process of combining an image with a background to create the appearance of partial transparency. It is often useful to render image elements in separate passes, and then combine the resulting multiple 2D images into a single, final image in a process called compositing. For example, compositing is used extensively when combining computer rendered image elements with live footage. Alpha blending comprises mixing pixel data from the various media content views using an alpha value to control the relative strength or contribution of the respective pixel data.

Techniques for managing overlapping media convent views, however, are not desirable for a number of reasons. For example, alpha blending partially relies upon an alpha value that is typically a static value, or varies based on some static rule such as fading over time. The static value or static rule may not match the real-time events or media content occurring in a multimedia conference call. In another example, a user interface may allow a user to manually control the alpha blending, but this requires constant attention and management by the user, which may not be desirable during a multimedia event. In yet another example, a user interface may allow a user to manually control which of the media content views is placed in a given layer (e.g., background and foreground), how much one media content view overlaps another media content view, and the alpha value, but again this requires specific user management which may be undesirable given the pace and tempo of a real-time multimedia event.

To solve these and other problems, a multimedia conferencing server and/or one or more computing devices participating in a multimedia event may include a context module arranged to automatically manage overlapping objects displayed during a multimedia event. The context module may receive context information from a multimedia event, and utilize the context information to generate various context parameters controlling various aspects of the overlapping objects for a display. A blending module may receive as input the various media content for the overlapping objects from various media sources, and the context parameters from the context module, and automatically and dynamically blend the media content to form the overlapping objects suitable for rendering on the display. In this manner, the overlapping objects may dynamically change or vary based on changes in the underlying context of a given multimedia event.

FIG. 1 illustrates a block diagram for a multimedia conferencing system 100. Multimedia conferencing system 100 may represent a general system architecture suitable for implementing various embodiments. Multimedia conferencing system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conferencing system 100 as shown in FIG. 1 has a limited number of elements in a certain topology, it may be appreciated that multimedia conferencing system 100 may include more or less elements in alternate topologies as desired for a given implementation. The embodiments are not limited in this context.

In various embodiments, multimedia conferencing system 100 may comprise, or form part of, a wired communications system, a wireless communications system, or a combination of both. For example, multimedia conferencing system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Multimedia conferencing system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

In various embodiments, multimedia conferencing system 100 may be arranged to communicate, manage or process different types of information, such as media information and control information. Examples of media information may generally include any data representing content meant for a user, such as voice information, video information, audio information, image information, textual information, numerical information, application information, alphanumeric symbols, graphics, and so forth. Control information may refer to any data representing commands, instructions or control words meant for an automated system. For example, control information may be used to route media information through a system, to establish a connection between devices, instruct a device to process the media information in a predetermined manner, and so forth.

In various embodiments, multimedia conferencing system 100 may include a multimedia conferencing server 130. Multimedia conferencing server 130 may comprise any logical or physical entity that is arranged to establish, manage or control a multimedia conference call between client devices 110-1-*m* over a network 120. Network 120 may comprise, for example, a packet-switched network, a circuit-switched network, or a combination of both. In various embodiments, multimedia conferencing server 130 may comprise or be implemented as any processing or computing device, such as a computer, a server, a server array or server farm, a work station, a mini-computer, a mainframe computer, a supercomputer, and so forth. Multimedia conferencing server 130 may comprise or implement a general or specific computing architecture suitable for communicating and processing multimedia information. In one embodiment, for example, the multimedia conferencing server 130 may be implemented using a computing architecture as described with reference to FIG. 4.

A specific implementation for multimedia conferencing server 130 may vary depending upon a set of communication protocols or standards to be used for multimedia conferencing server 130. In one example, multimedia conferencing server 130 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. In another example, the multimedia conferencing server 130 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. Both the SIP and H.323 standards are essentially signaling protocols for Voice over Internet Protocol (VoIP) or Voice Over Packet (VOP) multimedia conference call operations. It may be appreciated that other signaling protocols may be implemented for the multimedia conferencing server 130, however, and still fall within the scope of the embodiments.

In general operation, multimedia conference system 100 may be used for multimedia conference calls. Multimedia conference calls typically involve communicating voice, video, and/or data information between multiple end points. For example, a public or private packet network 120 may be used for audio conferencing calls, video conferencing calls, audio/video conferencing calls, collaborative document sharing and editing, and so forth. The packet network 120 may also be connected to the PSTN via one or more suitable VoIP gateways arranged to convert between circuit-switched information and packet information. To establish a multimedia conference call over the packet network 120, each client terminal 110-1-$m$ may connect to multimedia conferencing server 130 via the packet network 120 using various types of wired or wireless communications links operating at varying connection speeds or bandwidths, such as a lower bandwidth PSTN telephone connection, a medium bandwidth DSL modem connection or cable modem connection, and a higher bandwidth intranet connection over a local area network (LAN), for example.

In various embodiments, multimedia conferencing server 130 may establish, manage and control a multimedia conference call between client devices 110-1-$m$. In some embodiments, the multimedia conference call may comprise a live web-based conference call using a web conferencing application that provides full collaboration capabilities. Multimedia conferencing server 130 operates as a central server that controls and distributes media information in the conference. It receives media information from various client devices 110-1-$m$, performs mixing operations for the multiple types of media information, and forwards the media information to some or all of the other participants. One or more client devices 110-1-$m$ may join a conference by connecting to multimedia conferencing server 130. Multimedia conferencing server 130 may implement various admission control techniques to authenticate and add client devices 110-1-$m$ in a secure and controlled manner.

In various embodiments, multimedia conferencing system 100 may include one or more client devices 110-1-$m$ to connect to a multimedia conferencing server 130 over one or more communications connections via the network 120. For example, a client application may host multiple client devices each representing a separate conference at the same time. Similarly, a client application may receive multiple audio, video and data streams. For example, video streams from all or a subset of the participants may be displayed as a mosaic on the participant's display with a top window with video for the current active speaker, and a panoramic view of the other participants in other windows.

Client devices 110-1-$m$ may comprise any logical or physical entity that is arranged to participate or engage in a multimedia conference call managed by the multimedia conferencing server 130. Client devices 110-1-$m$ may be implemented as any device that includes, in its most basic form, a processing system including a processor and memory, one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of client devices 110-1-$m$ may include a telephone, a VoIP or VOP telephone, a packet telephone designed to operate on a Packet Switched Telephone Network (PSTN), an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. In some implementations, the client devices 110-1-$m$ may be implemented using a general or specific computing architecture similar to the computing architecture described with reference to FIG. 4.

Client devices 110-1-$m$ may comprise or implement respective client meeting modules 112-1-$n$. The client meeting modules 112-1-$n$ may be designed to interoperate with the server meeting module 132 of the multimedia conferencing server 130 to establish, manage or control a multimedia conferencing event. For example, the client meeting modules 112-1-$n$ may comprise or implement the appropriate application programs and user interface controls to allow the respective client devices 110-1-$m$ to participate in a web conference facilitated by the multimedia conferencing server 130. This may include input equipment (e.g., video camera, microphone, keyboard, mouse, controller, etc.) to capture media information provided by the operator of a client device 110-1-$m$, and output equipment (e.g., display, speaker, etc.) to reproduce media information by the operators of other client devices 110-1-$m$.

Client devices 110-1-$m$ may further comprise or implement respective media display modules 114-1-$p$. The media display modules 114-1-$p$ may be arranged to display separate or mixed media content received from the multimedia conference server 120. Different types of media information from the various computing devices may be received by the multimedia conference server 120 during a multimedia event. The multimedia conference server 120 distributes the media information to some or all of the other computing devices 110-1-$m$ participating in the multimedia event. As such, any given computing device 110-1-$m$ may have one or more displays 140 capable of displaying multiple media content views 132-1-$a$. Examples for the display 140 may include any electronic display suitable for the computing device 110-1-$m$, ranging from a digital television to a computer monitor to a touch screen display for a handheld device (e.g., cellular telephone). Examples for the multiple media content views 132-1-$a$ may include various GUI windows or views, typically with user interface controls to move a GUI view, modify a size for a GUI view, open a GUI view, close a GUI view, and otherwise modify characteristics of a GUI view.

The media content views 132-1-$a$ may each comprise respective media content 134-1-$b$. The media content 134-1-$b$ may comprise any type of media information as previously described. By way of example and not limitation, the media content 134-1 may comprise whiteboard content, the media content 134-2 may comprise presentation content, the media content 134-3 may comprise video content, the media content 134-4 may comprise chat (text) content, the media content 134-5 may comprise application content, the media content 134-6 may comprise audio content, and so forth. The embodiments are not limited in this context.

Due to the limited display area of the display 140, the media content views 132-1-$a$ may sometimes overlap each other to form multiple viewing layers. As shown in FIG. 1, for example, the media content view 132-1 may partially overlap the media content view 132-2. The overlapping portion of the media content view 132-1 rendered in a foreground layer may partially or fully occlude the corresponding portion of the media content view 132-2 rendered in a background layer, depending upon the size and position of the media content view 132-1.

To allow viewing of media content views 132-1-$a$ rendered in background layers, the media display module 114-1-$p$ may utilize alpha blending to make some or all of the media content views 132-1-$a$ in the foreground layers semi-transparent. As shown in FIG. 1, for example, a portion 136 of the media content view 132-2 may partially overlap a corresponding portion 138 of the media content view 132-3. The media display module 114-1-$p$, however, may be arranged to render the entire media content view 132-2, or the portion 136 of the media content view 132-2, as semi-transparent using alpha blending. Consequently, the portion 138 of the media content 134-3 of the media content view 132-3 is somewhat visible through the semi-transparent portion 136 of the media content view 132-2. A particular level or amount of transparency (or opacity) of a given media content view 132-1-*a* may be controlled in accordance with an alpha value for the alpha blending component.

As previously described, conventional techniques for managing overlapping media convent views, however, are not desirable for a number of reasons. For example, alpha blending partially relies upon an alpha value that is typically a static value, or varies based on some static rule such as fading over time. The static value or static rule may not match the real-time events or media content occurring in a multimedia conference call. In another example, a user interface may allow a user to manually control the alpha blending, but this requires constant attention and management by the user, which may not be desirable during a multimedia event. In yet another example, a user interface may allow a user to manually control which of the media content views are placed in a given layer (e.g., background and foreground), and how much one media content view overlaps another media content view, but again this requires user management which may be undesirable given the tempo and pace of a real-time multimedia event.

To solve these and other problems, the multimedia conference server 130 and/or a given computing device 110-1-*m* participating in a multimedia event may implement techniques to automatically and dynamically manage overlapping objects displayed during a multimedia event. In one embodiment, for example, this may be accomplished using the media display modules 114-1-*p* implemented for each computing device 110-1-*m*. Although the media display modules 114-1-*p* are shown and described with reference to the computing devices 110-1-*m* by way of example and not limitation, it may be appreciated that the structure, connections and operations of the media display modules 114-1-*p* may be implemented for other network devices within the multimedia conference system 100, such as the multimedia conferencing server 130. This may be desirable, for example, whenever the computing devices 110-1-*m* do not have the resources to perform some or all of the display operations.

The media display modules 114-1-*p* may each comprise or implement, among other elements, a context module and a blending module. The context module may be arranged to receive context information from a multimedia event, and utilize the context information to generate various context parameters controlling various aspects of the overlapping objects. The blending module may arranged to receive as input the various media content for the overlapping objects from various media sources, and the context parameters from the context module, and automatically and dynamically blend the media content to form the overlapping objects suitable for rendering on the display 140. In this manner, the relationship between overlapping objects may dynamically change based on the changes in the underlying context of a multimedia event.

Figure 2:
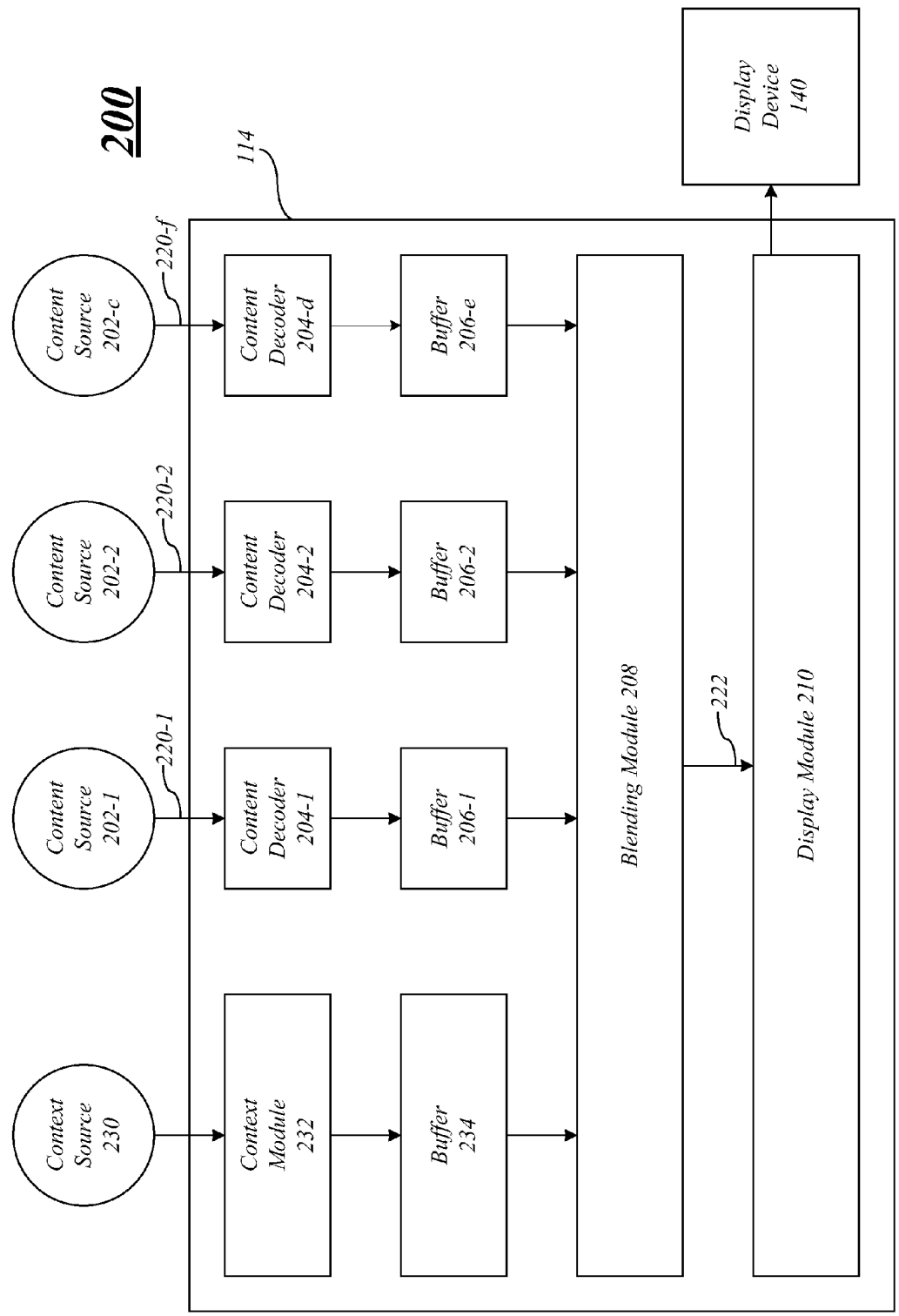
FIG. 2 illustrates an embodiment for a media display system.

FIG. 2 illustrates an embodiment for a media display system 200. The media display system 200 may be arranged to control, manage or display media information on the display 140 for a given computing device 110-1-*m*. In the illustrated embodiment shown in FIG. 2, the media display system may include multiple media content sources 202-1-*c*. The multiple media sources 202-1-*c* may be arranged to source multiple media content streams 220-1-*f* representing corresponding media contents 134-1-*b* for multiple media content views 132-1-*a* for a multimedia event. In one embodiment, for example, the media sources 202-1-*c* may comprise real-time media sources communicating real-time media content 134-1-*b* from the multimedia conferencing server 130 for a multimedia event.

The media display system 200 may include a media display module 114 representative of any one of the media display modules 114-1-*p*. The media display module 114 may include various media processing paths for each of the media content streams 220-1-*f*. Each media processing path may include an optional content decoder 204-1-*d* and a buffer 206-1-*e*.

The content decoders 204-1-*d* may be optionally implemented to receive one or more of the media content streams 220-1-*f*, decode the media content streams 220-1-*f*, and output the decoded media content streams to the blending module 208. This may be needed when a media content stream 220-1-*f* comprises encoded data, such as an encoded video content stream. In cases where a given media content stream 220-1-*f* is not encoded, however, the corresponding content decoder 204-1-*d* may be omitted from the respective media processing path. An example of the latter case may include application data from an application program, such as presentation content from a presentation application program.

The buffers 206-1-*e* may be optionally implemented to buffer one or more of the media content streams 220-1-*f* to synchronize the media content streams 220-1-*f* prior to blending operations performed by the blending module 208. This may be desirable, for example, when different media content streams 220-1-*f* arrive at different times, or require additional media processing operations, such as encoded video content streams.

The media display system 200 may also include a context source 230. The context source 230 may source context information from a multimedia event. The context source 230 may source the context information from the multimedia conference server 130 on a real-time basis representing a live multimedia event. The context source 230 may comprise the multimedia conferencing server 130, the display 140, the content sources 202-1-*c*, other portions of the media display module 114, and any other source capable of generating, monitoring or deriving context information for a multimedia event. In one embodiment, for example, the context source 230 may comprise information derived from the display 140 or the blended media stream 222, although the embodiments are not limited in this context.

The context module 232 may be operative to receive context information for a multimedia event from the context source 230. The context module 232 may determine multiple context parameters and/or control parameters for the multiple media content views 132-1-*a* based on the context information. The context module 232 may output the various context parameters and/or control parameters to the blending module 208. The blending module 208 may use the context parameters and/or control parameters to control blending operations for the various media content streams 220-1-*f*. As with the media processing paths, the context processing path may optionally include a buffer 234 to synchronize output from the context module 232 with the various media content streams 220-1-*f* prior to blending operations performed by the blending module 208.

The context module 232 may be arranged to determine or derive various types of context parameters based on context information for a multimedia event. Some examples of context parameters may include without limitation a refresh time parameter, a reference parameter, and a relevance parameter. Although a few examples of context parameters are described by way of example and not limitation, it may be appreciated that many different types of context parameters may be generated from the context information as desired for a given implementation. The embodiments are not limited in this context.

The context module 232 may be operative to determine context information for a multimedia event including a refresh time parameter. The refresh time parameter may represent a time interval between refresh events for media content 134-1-b for a media content view 132-1-a. The media content 134-1-b for a media content view 132-1-a may be periodically refreshed throughout a multimedia event. The context module 232 may use one or more timers to monitor and derive time statistics associated with refresh operations for the various media content views 132-1-a. For example, assume a meeting participant may be presenting slides, and as the meeting participant changes the slides, the media content 134-2 of the media content view 132-2 changes accordingly. The context module 232 may generate a refresh time parameter representing an average time interval between content changes, among other time statistics. The timers may be reset for each multimedia event, or within a given multimedia event, as desired for a given implementation.

The context module 232 may be operative to determine context information for a multimedia event including a reference parameter. The reference parameter may represent a number of times a media content view 132-1-a is referenced by a meeting participant. The media content 134-1-b for a media content view 132-1-a may be periodically referenced throughout a multimedia event. The media display module 114 may use one or more counters associated with each media content view 132-1-a to monitor and derive statistics associated with reference operations for the various media content views 132-1-a. For example, assume a meeting participant requests or has a question on a particular graphic, presentation or video. The media display module 114 may update the appropriate counter. The context module 232 may generate a reference parameter representing the corresponding counter values. The counters may be reset for each multimedia event, or within a given multimedia event, as desired for a given implementation.

The context module 232 may be operative to determine context information for a multimedia event including a relevance parameter. The relevance parameter may represent a value of a media content view relative to other media content views for the multimedia event. For example, the context module 232 may combine a refresh time parameter (or inverse of the refresh time parameter) with the reference parameter (or inverse of the reference parameter) to form the relevance parameter. The more the refresh time parameter and reference parameter indicates a higher level of interest by the participants or relevance of a given media content view 132-1-a, the relevance parameter represents a higher relative value for the given media content view 132-1-a. For example, a media content view 132-1-a with a higher refresh rate and a higher reference counter may provide strong evidence that the media content view 132-1-a is more relevant to the participants of the multimedia event at that given instant of the multimedia event than other media content views 132-1-a. Similarly, the more the refresh time parameter and reference parameter indicates a lower level of interest by the participants or relevance of a given media content view 132-1-a, the relevance parameter represents a lower relative value for the given media content view 132-1-a.

The context module 232 may derive these and other context parameters from the context information received from the context source 230 on a continuous, periodic or dynamic basis to reflect those media content views 132-1-a that are important to a multimedia event. The context module 232 may determine or derive various control parameters for the blending module 208 based on the context parameters and/or other context information. Some examples of control parameters may include without limitation an order parameter, an overlap parameter, and a blending parameter. Although a few examples of control parameters are described by way of example and not limitation, it may be appreciated that many different types of control parameters may be generated from the context parameters as desired for a given implementation. The embodiments are not limited in this context.

The context module 232 may determine an order parameter based on the context information received from the context source 230. The order parameter may represent an order of viewing layers for the multiple media content views based on the context information. The media display module 114 may render or display the various media content streams 220-1-f as corresponding media content views 132-1-a on the display 140. Each media content view 132-1-a may be displayed on a different viewing layer, such as a foreground layer, a background layer, and various intermediate layers. This servers various purposes, including allowing display objects in each layer to overlap each other to efficiently use limited display area for the display 140. Typically display objects become more opaque as they are rendered closer to the background layers, and more transparent as they are rendered closer to the foreground layers. This allows viewing of the background layers through the foreground layers with varying degrees of clarity based on the varying degree of transparency set for the foreground layers.

More particularly, the context module 232 may determine an order parameter based on one or more context parameters, including a refresh time parameter, a reference parameter, and a relevance parameter. For example, assume the context module 232 determines that the media content view 132-3 with media content 134-3 comprising video content may have a refresh time parameter, reference parameter and/or relevance parameter indicating a higher level of relevance for the media content view 132-3 than the media content view 132-2 with media content 134-2 comprising presentation content. The context module 232 may generate an order parameter representing the media content view 132-3 as part of the background layer and the media content view 132-2 as part of the foreground layer. This might reflect the design consideration that more relevant media content remains a solid background and less relevant media content becomes a transparent layout on tope of the solid background.

The context module 232 may determine an overlap parameter based on the context information received from the context source 230. The overlap parameter may represent an amount of overlap between two or more media content views based on the context information. For example, the overlap parameter may represent which portions of a given media content view 132-1-a overlap another media content view 132-1-a, such as portions 136, 138 of respective media content views 132-2, 132-3 as shown in FIG. 1.

More particularly, the context module 232 may determine an overlap parameter based on one or more context parameters, including a refresh time parameter, a reference parameter, and a relevance parameter. Continuing with our previous example, assume the context module 232 determines that the media content view 132-3 with media content 134-3 comprising video content has a higher relevance than the media content view 132-2 with media content 134-2 comprising presentation content based on one or more context parameters. The context module 232 may generate an overlap parameter representing the portion 136 of the media content view 132-2 should cover the portion 138 of the media content view 132-3. The particular amount of overlap might reflect the design consideration that more relevant media content should consume more display area, and should therefore be more visible (or less hidden) to a user, than less relevant media content.

In one embodiment, the context module 232 may determine a blending parameter based on the context information received from the context source 230. The blending parameter may represent an amount of blending for the overlapping media content views based on the context information. One example of a blending parameter may include an alpha value for alpha blending or alpha compositing operations.

More particularly, the context module 232 may determine a blending parameter based on one or more context parameters, including a refresh time parameter, a reference parameter, and a relevance parameter. Continuing again with our previous example, assume the context module 232 determines that the media content view 132-3 with media content 134-3 comprising video content has a higher relevance than the media content view 132-2 with media content 134-2 comprising presentation content based on one or more context parameters. The context module 232 may generate a blending parameter representing the portion 136 of the media content view 132-2 covering the portion 138 of the media content view 132-3 should be more transparent. The particular amount of transparency might reflect the design consideration that less relevant media content should be more transparent, and therefore less visible to a user, than more relevant media content.

The media display module 114 may include the blending module 208 communicatively coupled to the context module 232 and the content decoders 204-1-$d$ via the respective buffers 234 and 206-1-$e$. The blending module 208 may be operative to receive multiple media content streams 220-1-$f$ for multiple media content views 132-1-$a$ for a multimedia event. The blending module 208 may blend the media content streams 220-1-$f$ for the multiple media content views 132-1-$a$ based on the order parameter, the overlap parameter and the blending parameter to form a blended media content stream 222. The blending module 208 may output the blended media content stream 222 to a display module 210.

The media display module 114 may include the display module 210. The display module 210 may be communicatively coupled to the blending module 208 and the display 140. The display module 210 may be operative to receive the blended media content stream 222, and display the blended media content stream 222 as multiple overlapping media content views 132-1-$a$ on the display 140.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
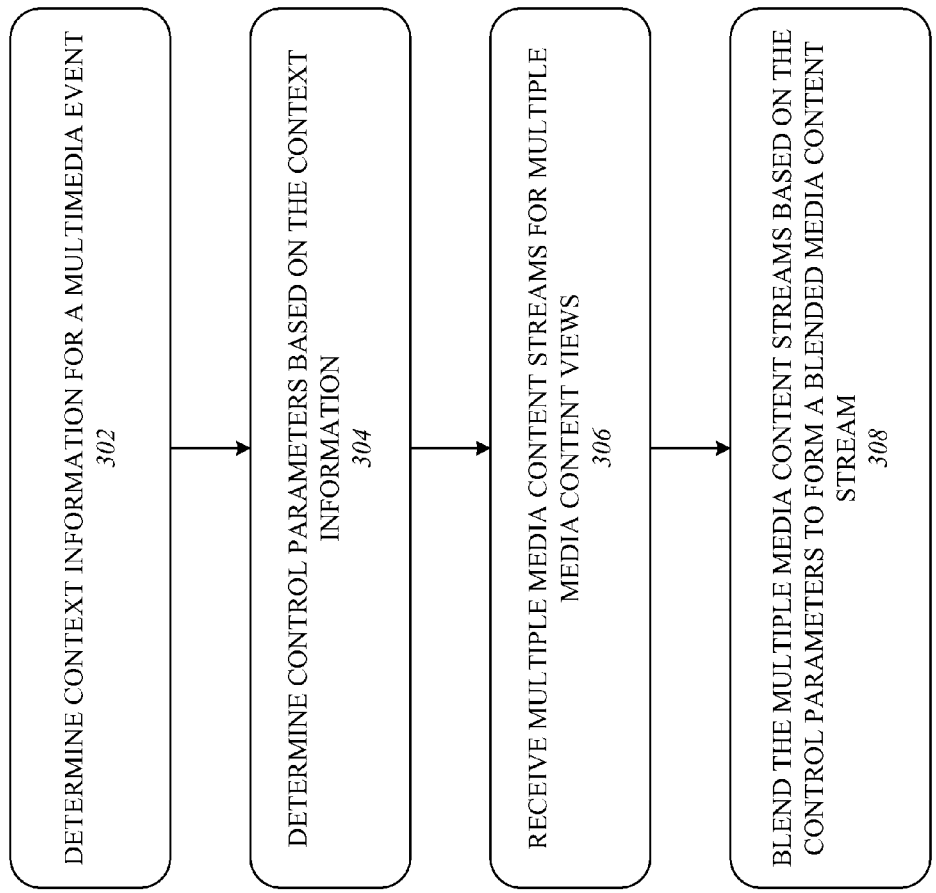
FIG. 3 illustrates an embodiment for a logic flow.

FIG. 3 illustrates one embodiment of a logic flow 300. Logic flow 300 may be representative of the operations executed by one or more embodiments described herein. As shown in FIG. 3, the logic flow 300 may determine context information for a multimedia event at block 302. The logic flow 300 may determine control parameters based on the context information at block 304. The logic flow 300 may receive multiple media content streams for multiple media content views at block 306. The logic flow 300 may blend the multiple media content streams based on the control parameters to form a blended media content stream at block 308. The embodiments are not limited in this context.

In one embodiment, the logic flow 300 may determine context information for a multimedia event at block 302. For example, the context module 232 may receive context information from the context source 230, and determine one or more context parameters from the received context information, including a refresh time parameter, a reference parameter, and a relevance parameter.

In one embodiment, the logic flow 300 may determine control parameters based on the context information at block 304. For example, the context module 232 may determine an order parameter, an overlap parameter and a blending parameter for multiple media content views based on the context information at block 304. The context module 232 may use the context parameters to determine one or more control parameters for controlling blending operations for the blending module 208. The context module 232 may use various heuristics or rules to evaluate the context parameters and generate the appropriate control parameters. Further, the context module 232 may perform such operations on a continuous, periodic or otherwise dynamic basis to reflect changes in the context parameters.

In one embodiment, the logic flow 300 may receive multiple media content streams for multiple media content views at block 306. For example, the media display module 114 may have multiple media processing paths having optional content decoders 204-1-$d$ and corresponding optional buffers 206-1-$e$. The separate media processing paths may receive and process multiple media content streams 220-1-$f$ having media content 134-1-$b$ for the media content views 132-1-$a$.

In one embodiment, the logic flow 300 may blend the multiple media content streams based on the control parameters to form a blended media content stream at block 308. For example, the blending module 208 may receive the processed media content streams 220-1-$f$, and one or more control parameters from the context module 232, and perform blending operations for the processed media content streams 220-1-$f$ based on the control parameters. More particularly, the blending module 208 may blend the multiple media content streams 220-1-$f$ based on the order parameter, the overlap parameter and the blending parameter to form the blended media content stream 222. The blending module 208 may output the blended media content stream 222 to the display module 210, which in turn renders the media convent views 132-1-$a$ on the display 140.

Figure 4:
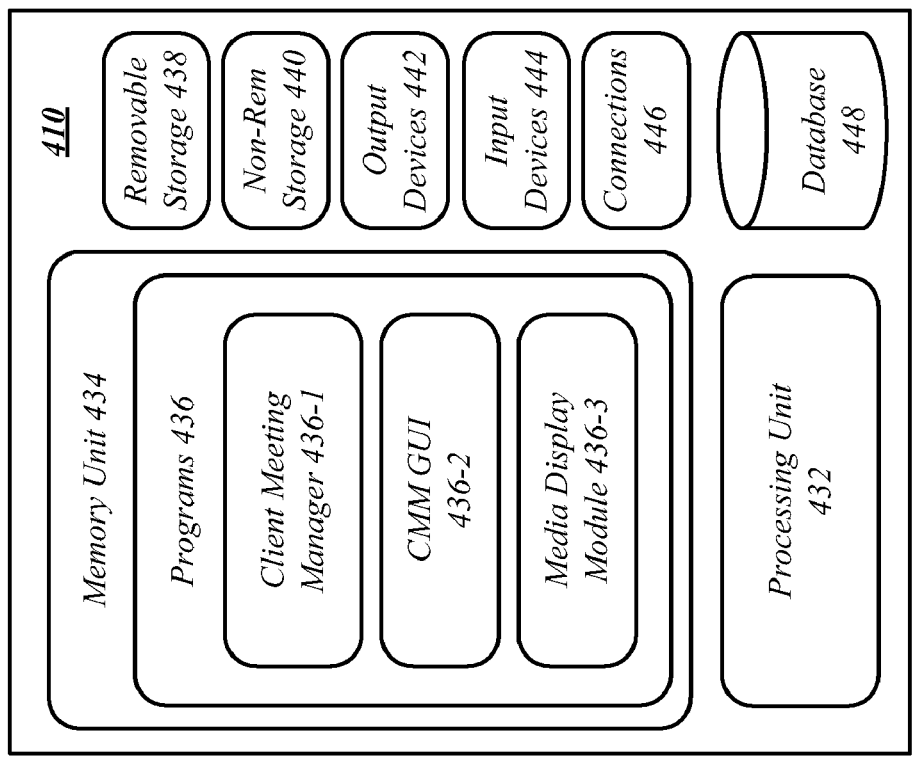
FIG. 4 illustrates an embodiment for a computing architecture.

FIG. 4 further illustrates a more detailed block diagram of computing device 410. Computing device 410 may be representative of any computing devices 110-1-$m$. In a basic configuration, computing device 410 typically includes at least one processing unit 432 and memory 434. Memory 434 may be implemented using any machine-readable or computer-readable media capable of storing data, including both volatile and non-volatile memory. For example, memory 434 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 4, memory 434 may store various software programs, such as one or more application programs 436-1-r and accompanying data.

Computing device 410 may also have additional features and/or functionality beyond its basic configuration. For example, computing device 410 may include removable storage 438 and non-removable storage 440, which may also comprise various types of machine-readable or computer-readable media as previously described. Computing device 410 may also have one or more input devices 444 such as a keyboard, mouse, pen, voice input device, touch input device, measurement devices, sensors, and so forth. Computing device 410 may also include one or more output devices 442, such as displays, speakers, printers, and so forth.

Computing device 410 may further include one or more communications connections 446 that allow computing device 410 to communicate with other devices. Communications connections 446 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A method, comprising:
  determining context information for a multimedia conference event;
  generating one or more context parameters utilizing the context information, the one or more context parameters comprising a relevance parameter representing a relative value of a media content view relative to other media content views for the multimedia conference event;
  determining one or more control parameters based on the one or more context parameters, the one or more control parameters comprising:
    an order parameter representing an order of viewing layers for multiple media content views and an overlap parameter representing an amount of overlap between two or more media content views, the overlap parameter determined based on the relevance parameter; and a blending parameter representing an amount of blending for the overlapping media content views based on the one or more context parameters;

receiving multiple media content streams for the multiple media content views; and automatically and dynamically blending the multiple media content streams based on the one or more control parameters to form a blended media content stream.

2. The method of claim 1, comprising displaying overlapping media content views on a display using the blended media content stream.

3. The method of claim 1, the one or more context parameters comprising a refresh time parameter representing a time interval between refresh events for media content for a media content view.

4. The method of claim 1, the one or more context parameters comprising a reference parameter representing a number of times a media content view is referenced by a meeting participant.

5. The method of claim 4, the relevance parameter derived by combining the reference parameter with a refresh time parameter representing a time interval between refresh events for media content for a media content view.

6. An article of manufacture comprising a computer-readable storage medium containing instructions that if executed enable a system to:

generate one or more context parameters to include a refresh time parameter, a reference parameter and a relevance parameter utilizing context information determined for a multimedia conference event, the refresh time parameter representing a time interval between refresh events for media content for a media content view, the reference parameter representing a number of times a media content view is referenced by a meeting participant, the relevance parameter representing a relative value of a media content view relative to other media content views for the multimedia conference event;

determine one or more control parameters comprising an order parameter, an overlap parameter and a blending parameter for multiple media content views based on the one or more context parameters, the order parameter representing an order of viewing layers for the multiple media content views, the blending parameter representing an amount of blending for the overlapping media content views, the overlap parameter representing an amount of overlap between two or more media content views and determined based on the relevance parameter;

receive multiple media content streams for the multiple media content views; and automatically and dynamically blend the multiple media content streams based on the one or more control parameters.

7. The article of manufacture of claim 6, further comprising instructions that if executed enable the system to display overlapping media content views on a display using the blended media content stream.

8. The article of manufacture of claim 6, the relevance parameter derived by combining the reference parameter with the refresh time parameter.

9. The article of manufacture of claim 6, further comprising instructions that if executed enable the system to buffer one or more of the media content streams to synchronize the media content streams prior to performing blending operations.

10. An apparatus, comprising:

a context module operative to receive context information for a multimedia conference event, and generate one or more context parameters and one or more control parameters for the multimedia conference event, the one or more context parameters generated utilizing the context information and comprising a relevance parameter representing a relative value of a media content view relative to other media content views for the multimedia conference event, the one or more control parameters comprising:

an order parameter representing an order of viewing layers for multiple media content views and an overlap parameter representing an amount of overlap between two or more media content views, the overlap parameter determined based on the relevance parameter; and a blending parameter representing an amount of blending for the overlapping media content views;

a blending module communicatively coupled to the context module, the blending module operative to receive multiple media content streams for the multiple media content views for the multimedia conference event, and automatically and dynamically blend the multiple media content streams for the multiple media content views based on the one or more control parameters to form a blended media content stream;

a display module communicatively coupled to a display, the display module to receive the blended media content stream, and display the blended media content stream as multiple overlapping media content views on the display; and a processor implementing one or both of the context module or the blending module.

11. The apparatus of claim 10, the one or more context parameters including comprising a refresh time parameter representing a time interval between refresh events for media content for a media content view and a reference parameter representing a number of times a media content view is referenced by a meeting participant, the relevance parameter derived by combining the reference parameter with the refresh time parameter.

12. The apparatus of claim 10, comprising a content decoder to receive one or more of the media content streams, decode the media content streams, and output the decoded media content streams to the blending module.

* * * * *